UNITED STATES PATENT OFFICE.

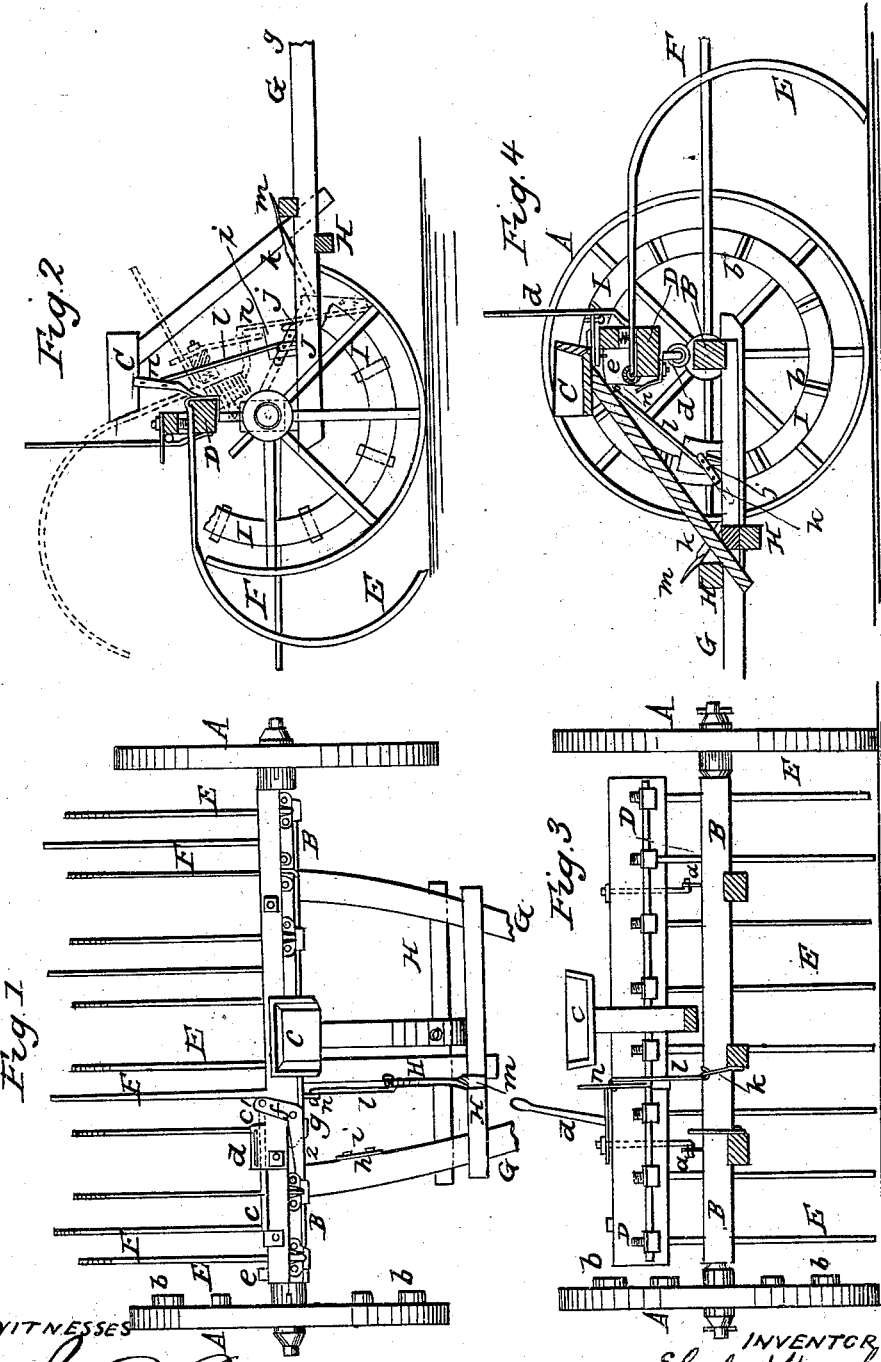

SAMUEL EBERLY AND SAMUEL HAUCK, OF MECHANICSBURG, PA.

IMPROVEMENT IN HORSE-RAKES.

Specification forming part of Letters Patent No. 70,327, dated October 29, 1867.

*To all whom it may concern:*

Be it known that we, SAMUEL EBERLY and SAMUEL HAUCK, of Mechanicsburg, in the county of Cumberland and State of Pennsylvania, have invented certain new and useful Improvements in Horse Hay-Rakes; and that the following is a full, clear, and exact description of the same, reference being had to the accompanying drawings, making a part of this specification, in which—

Figure 1 represents a top plan of the rake. Fig. 2 represents a sectional elevation from the side of the machine, and showing the mechanism in two positions—one as in the act of raking, and the other, in red lines, as in the act of delivering or dropping the raked material in the windrow. Fig. 3 represents a front elevation, partially in section. Fig. 4 represents a vertical central section through the machine.

Similar letters of reference, where they occur in the separate figures, denote like parts of the machine in all the drawings.

Our invention relates to certain mechanical appliances, whereby the rake, in being dumped, or delivered of the raked-up material, may be caused to rise to a greater or less height, as the height of the windrow desired to be made may require.

To enable others skilled in the art to make and use our invention, we will proceed to describe the same by reference to the drawings.

A A represent the carrying-wheels; B, the axle, supported in the same; C, the driver's and operator's seat on the machine; and D the rake-head, which is hinged to the axle as at $a$, so that it may be turned up or dropped down, and E the rake-teeth, secured thereto, which work between the clearers F, set in the rear of the axle B. G is the shafts, by which the machine is drawn, and H the braces for strengthening the shafts. These parts may be constructed in any of the usual well-known ways.

On one of the carrying-wheels A there is a rim, I, having on it a series of tappets, $b\ b$, &c., and upon the rake-head D there is a sliding rod or shaft, $c$, that can be operated by a lever, $d$, within reach of the driver in his seat C. Said rod or shaft may have a friction-roller, $e$, upon its outer end, which end, when run out, is taken by one of the tappets, and causes it, as well as the rake-head and rake attached, to be raised up, as shown by the red lines in Fig. 2. Upon the interior end of the rod or shaft $c$ there is a bent end or arm, which extends into a slot or opening in the arm 1 of a bell-crank lever, $f$, that is pivoted at $g$, and when the rod or shaft $c$ is moved this bell-crank lever $f$ is also moved. On the shaft G, at or near the point $h$, there is a plate, $i$, with slots $j$ in it, so that, by set-screws passing through said slots and into the shaft, said plate may be adjusted up or down, and, when adjusted, firmly held in place.

A foot-lever, $k$, is pivoted to the brace H, and from the end of said lever, in rear of its pivoted point, a connecting-rod, $l$, extends to and connects with the arm $n$ on the rake-head. So long as the driver keeps his foot upon the lever at $m$ the rake-teeth will be held down in raking position, close to the ground. When enough has been gathered, or the windrow reached, the driver removes his foot and runs the shaft $c$ out by means of the hand-lever $d$.

The first tappet $b$ that comes around takes against the end of the rod or shaft $c$, and, tipping the rake-head, causes the teeth to rise up and drop the gathered material. The rod or shaft continues to go around with the tappet-wheel, until the arm 2 of the lever $f$, which serves as a trigger, strikes against the plate $i$, which causes said lever to swing upon its pivot and its arm 1 to draw back the rod or shaft $c$, taking it out of contact with the tappet, and the rake-teeth immediately drop down to, or near to, the ground, swinging the rake-head up into a vertical position, and the raking again proceeds. The rake is not tripped or let fall until the tail 2 of the lever $f$ comes against the plate $i$, so that the nearer to or farther from the sweep of the rake-head this plate $i$ is moved the less or greater height the rake will rise, and when large windrows are being made, as in preparing to haul in the hay or other material, or the lesser windrows are better, as in making or curing the crop, the rake can be made to rise over either kind of windrow by merely shifting the plate $i$. The driver simply shifts or moves out the rod or shaft. All the other sequent operations are automatic, and require no attention from him.

Having thus fully described our invention, we would state that we are aware that hay-rakes have been raised up by cams or lifting- pieces on the carrying-wheels, and dropped down by an automatic disconnecting apparatus. This we do not claim; but What we do claim as new, and desire to secure by Letters Patent, is—

In combination with the sliding rod that takes against the projections on the carrying-wheel to lift up the rake, the trigger, pivoted and connected thereto, and the adjustable tripper or let-off, so that the height to which the rake may rise may be regulated to the height of the windrows of hay, grass, or other material desired to be gathered, substantially as described.

SAMUEL EBERLY.
SAMUEL HAUCK.

Witnesses:
R. WILSON,
JOSEPH LEAS.